United States Patent
Bolla et al.

(10) Patent No.: US 9,201,800 B2
(45) Date of Patent: Dec. 1, 2015

(54) RESTORING TEMPORAL LOCALITY IN GLOBAL AND LOCAL DEDUPLICATION STORAGE SYSTEMS

(71) Applicant: DELL PRODUCTS L.P., Round Rock, TX (US)

(72) Inventors: Ratna Bolla, Hyderabad (IN); Vinod Jayaraman, San Franisco, CA (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 13/936,344

(22) Filed: Jul. 8, 2013

(65) Prior Publication Data

US 2015/0012698 A1 Jan. 8, 2015

(51) Int. Cl.
*G06F 12/08* (2006.01)
*G06F 3/06* (2006.01)
*G06F 17/30* (2006.01)
*H04L 29/08* (2006.01)

(52) U.S. Cl.
CPC .......... *G06F 12/0866* (2013.01); *G06F 3/0641* (2013.01); *G06F 12/0804* (2013.01); *G06F 17/30156* (2013.01); *H04L 67/2842* (2013.01)

(58) Field of Classification Search
CPC ..................... G06F 17/30156; H04L 67/2842
See application file for complete search history.

(56) References Cited

U.S. PATENT DOCUMENTS

| | | | | |
|---|---|---|---|---|
| 2012/0124012 A1* | 5/2012 | Provenzano et al. | ......... | 707/692 |
| 2012/0131025 A1* | 5/2012 | Cheung et al. | ................ | 707/755 |
| 2012/0158672 A1* | 6/2012 | Oltean et al. | .................. | 707/692 |
| 2012/0159098 A1* | 6/2012 | Cheung et al. | ................ | 711/162 |
| 2012/0233135 A1* | 9/2012 | Tofano | .......................... | 707/692 |
| 2013/0086006 A1* | 4/2013 | Colgrove | .............. | G06F 3/0688 707/692 |
| 2013/0326156 A1* | 12/2013 | Cui et al. | ...................... | 711/144 |
| 2014/0279927 A1* | 9/2014 | Constantinescu et al. | .... | 707/679 |

OTHER PUBLICATIONS

Zhu, Benjamin, Avoiding the Disk Bottleneck in the Data Domain Deduplication File System, 2008, 6th USENIX Conference on File and Storage Technologies.*

Dubois, Laura et al., "Backup and Recovery: Accelerating Efficiency and Driving Down IT Costs Using Data Deduplication", White Paper, IDC, Retrieved from the Internet: <http://www.usicorp.com/Doc/USI%20White%20Papers/idc-20090519-data-deduplication.pdf (Feb. 1, 2010)>, Accessed on Dec. 29, 2013, Feb. 2010, 16 pgs.

(Continued)

*Primary Examiner* — Ryan Bertram
(74) *Attorney, Agent, or Firm* — Kwan & Olynick LLP

(57) ABSTRACT

Techniques and mechanisms described herein facilitate the restoration temporal locality in global and local deduplication storage systems. According to various embodiments, when it is determined that cache memory in a storage system has reached a capacity threshold, each of a plurality of data dictionary entries stored in the cache memory may be associated with a respective merge identifier. Each data dictionary entry may correspond with a respective data chunk. Each data dictionary entry may indicate a storage location of the respective data chunk in the storage system. The respective merge identifier may indicate temporal locality information about the respective data chunk. The plurality of data dictionary entries may be stored to disk memory in the storage system. Each of the stored plurality of data dictionary entries may include the respective merge identifier.

15 Claims, 6 Drawing Sheets

(56) References Cited

OTHER PUBLICATIONS

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-22.pdf>, Accessed on Dec. 29, 2013, Jun. 6, 2009, 14 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl.edu/cgi/viewcontent.cgi?article=1059&context=csetechreports>, Accessed on Dec. 29, 2013, Jan. 5, 2009, 20 pgs.

\* cited by examiner

US 9,201,800 B2

RESTORING TEMPORAL LOCALITY IN GLOBAL AND LOCAL DEDUPLICATION STORAGE SYSTEMS

TECHNICAL FIELD

The present disclosure relates generally to data storage, and more specifically to the operation of deduplication storage systems.

DESCRIPTION OF RELATED ART

In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. Each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

An important building block of a deduplication storage system is an index or a dictionary that maps the fingerprint of a chunk to its location on disk. Because modern deduplication storage systems index tens or hundreds of terabytes of data, and an average chunk size is relatively small (e.g., 8 kilobytes), the dictionary often cannot fit in memory and needs to reside on disk. Identifying a duplicate data segment may involve accessing the on-disk dictionary, thus becoming the bottleneck of the entire deduplication system. Duplicate chunks can be identified more efficiently when access to the on-disk dictionary can be reduced or avoided.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
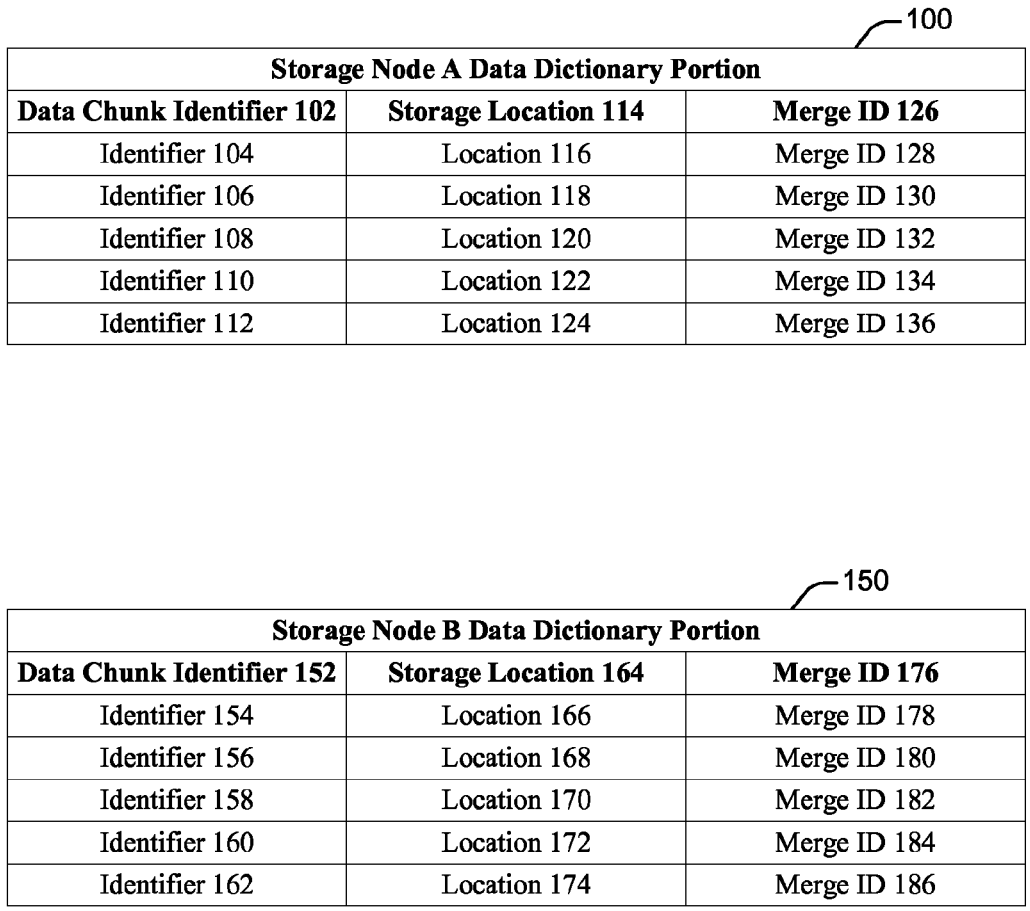
FIG. 1 illustrates a particular example of an arrangement of data dictionary information in two different storage nodes.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may employ temporal locality to heuristically reduce disk access in a data storage system. The techniques described may be used in conjunction with local storage or networked storage. A data dictionary may be used to look up the storage location on disk of a data chunks based on a fingerprint or hash of the data chunk. When a hash corresponding to a target data chunk is looked up in the on-disk dictionary, the corresponding disk address is loaded into cache memory. Temporal locality information may be included with the entries in the dictionary. Then, a set of disk addresses of data chunks merged onto disk at the same time as the target data chunk may be opportunistically loaded back into memory at the same time as the disk address of the target data chunk. The opportunistic retrieval of data chunks temporally local to the target data chunk takes advantage of the increased likelihood that such data chunks will be requested in the near future after the target data chunk is requested.

Example Embodiments

When data is stored to a deduplication storage system, the data is divided into data chunks. Each data chunk is associated with a fingerprint or hash that uniquely identifies the data chunk. Each chunk is also associated with a disk address that identifies the location on disk at which the data chunk is stored. A data dictionary may be used to map the fingerprint or hash of a data chunk to its corresponding storage location on disk.

Maintaining and operating a deduplication storage system may involve operations such as storing data chunks to the storage system, identifying duplicate data chunks and reducing duplication, and retrieving data chunks stored on the storage system. The data dictionary may be used to facilitate these operations. For instance, the system may receive or generate a request to determine whether any data chunk corresponding to a chunk fingerprint or hash is stored on the storage system. In order to respond to this request, the system may access the data dictionary, which includes an entry if the requested data chunk is present in the system and which indicates the location at which the requested data chunk is stored.

Modern storage systems often store such a large amount of data that the data dictionary cannot reside fully in cache memory and must instead be stored on disk. However, access to disk-based storage memory is considerably slower than access to cache-based memory. Moreover, the reduction in speed due to disk access increases not only with the volume of data retrieved from disk, but also with the number of times that the disk is accessed. Accordingly, the speed of performing many of the operations involved in maintaining an operating the deduplication storage system may be reduced by the additional latency involved in accessing the disk-based data dictionary.

According to various embodiments, a portion of the data dictionary may be stored in cache memory in order to reduce the number of times that data dictionary information is stored to and retrieved from disk. For instance, when data chunks are stored to disk, the fingerprint and storage location for each data chunk is stored in cache memory for a period of time. When the cache reaches a fullness threshold, the cached data dictionary information is merged to disk. Then, the cache memory can be made available for newly received data chunk fingerprint and storage location information.

According to various embodiments, when requests to identify data chunks are received or generated, the cached data dictionary information may be checked first before access the data dictionary information stored on disk. In this way, access time may be significantly reduced if the requested data dictionary information is available in the cache. However, many common workloads faced by data deduplication systems result in data dictionary information being merged to disk before it is needed for future tasks.

Many data storage workloads in modern data deduplication storage systems involve tasks such as data backup in which the amount of data ingested by the system is large. In such workloads, the data dictionary information stored in cached memory is merged to disk and overwritten before the backup is repeated at a later time. When the backup is repeated, data chunks that are duplicated across the two backups may need to be identified in order to reduce the volume of stored data. However, because the data dictionary information for the data is no longer stored in cache memory, identifying duplicate data chunks in such situations may involve repeated access to disk-based storage, thus slowing down the storage and deduplication operations.

FIG. 1 illustrates a particular example of an arrangement of data dictionary information in two different storage nodes. The data dictionary information shown in FIG. 1 is divided into the storage node A data dictionary portion 100 and the storage node B data dictionary portion 150. Although data dictionary information corresponding to two storage nodes is shown in FIG. 1, various implementations may include one, two, or potentially many different storage nodes.

The storage node A data dictionary portion 100 includes the data chunk identifier category 102. The data chunks stored in the storage node A are associated with the identifiers 104-112. Similarly, the storage node B data dictionary portion 150 includes the data chunk identifier category 152. The data chunks stored in the storage node B are associated with the identifiers 154-162.

According to various embodiments, each data chunk identifier may uniquely (or almost uniquely) identify a particular data chunk. For instance, a data chunk identifier may be created by applying a hash function to the content included in a data chunk. In this way, the data chunk identifier may function as an index by which the location of a data chunk may be identified if the data chunk is stored in the storage system.

The storage node A data dictionary portion 100 includes the storage location category 114. The data chunks stored in the storage node A are associated with the storage locations 116-124. Similarly, the storage node B data dictionary portion 150 includes the storage location category 164. The data chunks stored in the storage node A are associated with the storage locations 166-174.

According to various embodiments, the storage location identifies the address on disk at which the data chunk associated with the corresponding identifier is stored. Thus, the data dictionary may be used to retrieve a data chunk from disk. For instance, a requested data chunk may be hashed to create an identifier. The identifier may then be looked up in the data dictionary. If the identifier is found, the data chunk may be retrieved from the storage system identified in the dictionary.

According to various embodiments, the data dictionary may be used for deduplication. When a request to store a data chunk is received, the data chunk may first be looked up in the data dictionary as previously described. If the data chunk is already present in the storage system, then a reference to the data chunk may be stored instead of storing the duplicate data.

The storage node A data dictionary portion 100 includes the merge identifier (ID) category 126. The data chunks stored in the storage node A are associated with the merge IDs 128-136. The storage node B data dictionary portion 150 includes the merge ID category 176. The data chunks stored in the storage node A are associated with the merge IDs 178-186.

According to various embodiments, each data chunk may be associated with a merge ID when it is merged to disk. The merge ID may provide an indication of the temporal locality of the data chunk. That is, data chunks that are stored to disk at or around the same time may be associated with the same merge ID or with similar merge IDs that indicate that the data chunks share temporal locality. For instance, in FIG. 1, if the data chunks corresponding to the identifiers 104 and 106 are stored to disk at the same time, then the merge ID 128 and the merge ID 130 may be identical or similar. For example, the data chunks corresponding to the identifiers 104 and 106 may both be associated with a common data storage task such as the data storage task A2 210 shown below in FIG. 2.

According to various embodiments, the merge ID may allow opportunistic loading of disk addresses of temporally local data chunks. When a location of one of the data chunks is requested after its disk address has been stored to the data dictionary on disk, its disk address may be retrieved from the disk-based data dictionary and stored to cache. At the same time, the disk addresses of other data chunks with the same merge ID or similar merge IDs may also be retrieved. In this way, a temporal snapshot of stored data addresses can be reloaded into the in memory cache at the same time. Techniques for retrieving data dictionary information are discussed in further detail with respect to FIGS. 2-4.

According to various embodiments, the data dictionary may be indexed to a particular size, such as to the total physical capacity of the storage system. The data dictionary information may be divided into pages, which may be equal in size. For instance, the page size may be strategically determined based on system input/output efficiencies.

According to various embodiments, a mapping function may be created such that there is a unique, one-to-one mapping between a hashed data chunk identifier value and the page in the dictionary where the hash may be found. Thus, when a data chunk is hashed, the page in the data dictionary on which the storage information for the data chunk is located may be quickly identified.

According to various embodiments, some number of entries from each page in the dictionary may be cached in memory as well. A page in cache memory and a page on disk may be related by a one-to-one mapping. However, the page in cache memory may contain fewer entries than the corresponding page on disk.

According to various embodiments, when a lookup of a data chunk is performed, the data chunk may be hashed to create an identifier value. The identifier value may identify the page on which the data chunk storage information is located. A lookup may be first performed in the cached page before accessing the data dictionary information stored on disk.

According to various embodiments, when the number of entries in a cached page reaches a certain threshold (e.g., a designated percentage of the total entries), the new entries in cache memory may be merged with existing entries on the disk. Techniques for merging data dictionary information stored in cached memory to disk are discussed in further detail with respect to FIGS. 2 and 3.

According to various embodiments, the data dictionary may be partitioned across nodes that form a deduplication storage cluster. In this way, the data stored in the storage system may be divided across different nodes. The hashed data chunk identifier may identify the network node at which the data chunk is stored.

According to various embodiments, when a data chunk is hashed to an identifier corresponding to a node containing the dictionary partition associated with the data chunk, a lookup request may be dispatched to the remote node. If the hashed is found in the remote node, the storage location associated with the hashed data chunk may be transmitted to the requesting node. At the same time, one or more hashes merged to disk in the remote data dictionary portion at the same time as the hashed data chunk may be opportunistically transmitted to the node at which the request originated.

When pages in the dictionary are accessed and entries with the same or similar merge-ids are transmitted to the originating node, most or all of a temporal snapshot of a backup can be reloaded into the in-memory cache of the originating node in rapid succession. By opportunistically loading temporally contiguous data in this fashion, further network and disk access may be reduced.

Figure 2:
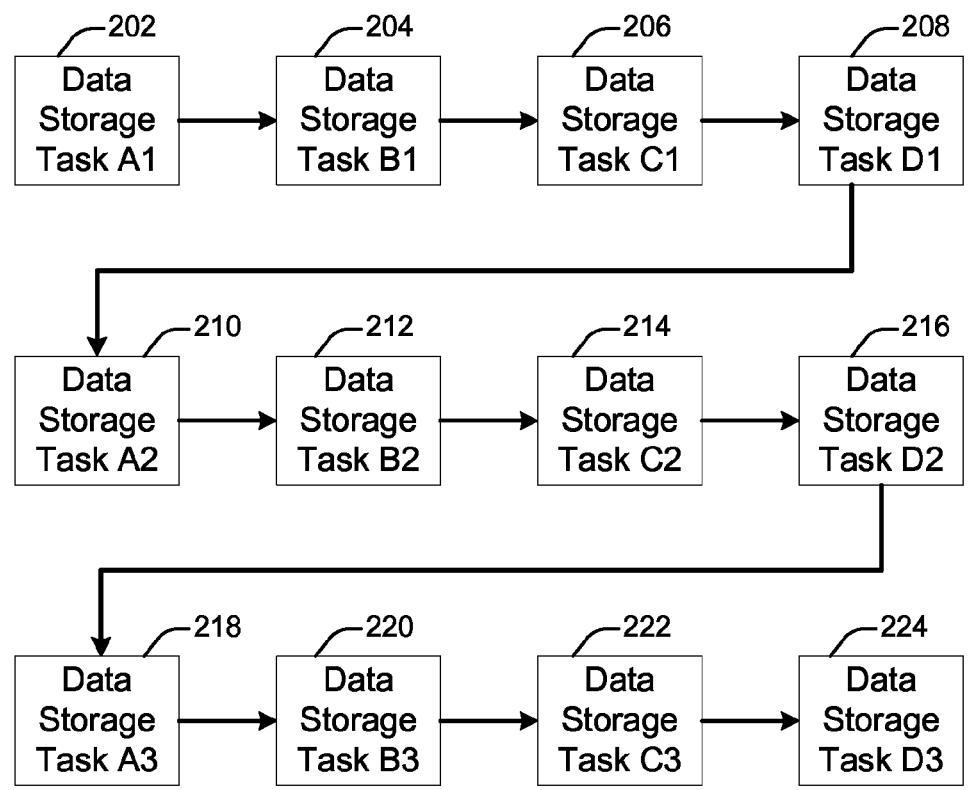
FIG. 2 illustrates a particular example of a sequence of data storage tasks performed by a data deduplication storage system.

FIG. 2 illustrates a diagram of an example of a series of storage tasks faced by a deduplication storage system. FIG. 2 includes data storage tasks 202-224. Deduplication storage systems may face many different types of storage tasks and workloads. Thus, the configuration of tasks shown in FIG. 2 is only one example presented for the purpose of illustration.

According to various embodiments, the data storage tasks are performed by the data deduplication storage system in chronological order starting with the data storage task A1 202 and ending with the data storage task D3 224. Each task represents a set of operations such as backing up data received via a network. Any type of data may be stored by the deduplication storage system, such as backup data for a file, a group of files, a storage disk, a group of storage disks, a server, a file system, or any other grouping of data.

According to various embodiments, data storage tasks that share a letter correspond to different instances of related storage tasks. For instance, the data storage task A1 may correspond to a request to back up a particular storage disk accessible via the network. The data storage tasks A2 210 and A3 218 may correspond to request to back up the same storage disk but at later points in time. Thus, the data storage task A2 210 may involve storing data that overlaps considerably with data stored in data storage task A1 202. Similarly, the data storage task A3 218 may involve storing data that overlaps considerably with data stored in data storage tasks A1 202 and A2 210.

According to various embodiments, in order to reduce duplication between successive backups of overlapping data, the storage system may search the data dictionary for data chunks that have been previously stored. For instance, when the data storage task A2 210 is performed, the system may search the data deduplication storage system to determine if any of the data chunks designated for backup in the data storage task A2 210 have previously been stored.

According to various embodiments, because the data storage task A2 210 corresponds to a later instance of the data storage task A2 202, the data stored in association with the data storage task A1 202 may be most likely to include data chunks designated for storage in association with the data storage task A1 202. However, the data deduplication storage system has performed three other tasks (the data storage tasks B1 204, C1 206, and D1 208) in the intervening period between performing the data storage task A1 202 and the data storage task A2 210. The performance of these intervening data storage tasks means that the data dictionary information stored in cache memory when the data storage task A1 202 was performed has likely been merged to disk to make room in the cache memory for performing the intervening data storage tasks B1 204, C1 206, and D1 208.

According to various embodiments, when a subsequent data storage task such as the data storage task A2 210 is performed, temporal locality information may be used to retrieve data dictionary information for data chunks stored close in time to data dictionary information associated with a requested data chunk.

It should be noted that the example configuration of data chunk dictionary entries shown in FIG. 2 is simplified for clarity. In practice, data dictionaries may have entries for potentially many different data chunks.

Figure 3:
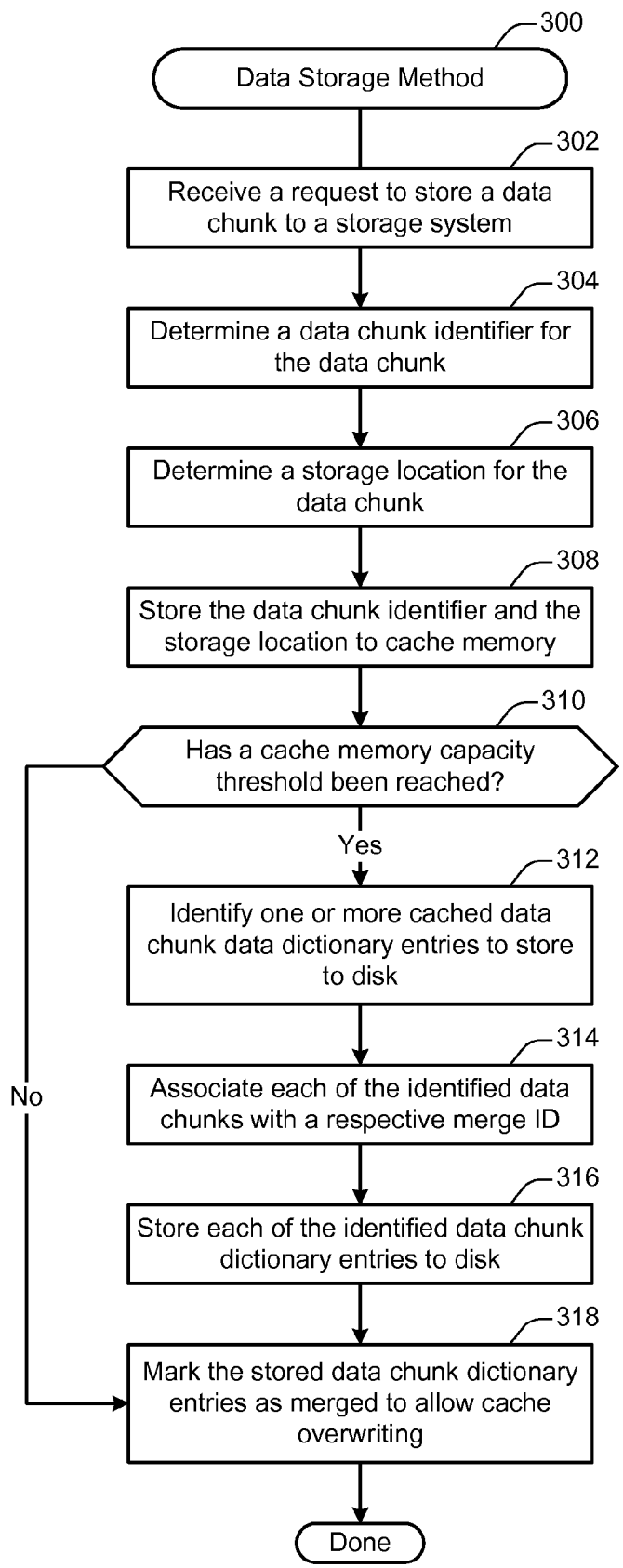
FIG. 3 illustrates a particular example of a method for data storage, performed in accordance with one or more embodiments.

FIG. 3 illustrates a particular example of a method 300 for data storage, performed in accordance with one or more embodiments. According to various embodiments, the method 300 may be performed at a computing device that functions as a controller or node in a deduplication storage system. The method 300 may be performed when the storage system receives a request to store a data chunk.

At 302, a request to store a data chunk to the storage system is received. According to various embodiments, the request may identify a data chunk. The data chunk may be any type of data and may be of any size supported by the storage system. The data chunk may be stored to the storage system as part of a larger group of data chunks, such as a group of data chunks stored as part of an operation backing up a file, a group of files, a file system, a storage disk, a group of storage disks, or any other data source.

In particular embodiments, the request to store the data chunk may be generated when it is determined that the data chunk has not been previously stored in the storage system. For instance, prior to storing the data chunk, the data chunk identifier associated with the data chunk may be looked up in the data dictionary to determine whether the data chunk is already stored at a storage location in the storage system.

At 304, a data chunk identifier is determined for the data chunk. According to various embodiments, the data chunk identifier may be determined by applying a hash function to the data chunk. The data chunk may be used to identify various other types of information, such as a page in the data dictionary on which the data dictionary information associated with the data chunk should be stored. The data chunk identifier may be substantially similar to the identifiers discussed with respect to FIG. 1.

At 306, a storage location is determined for the data chunk. According to various embodiments, the storage location may be strategically determined based on any of a variety of considerations associated with storage systems. For instance, the storage locations associated with data chunks may be distributed across storage disks and/or storage nodes in order to balance the storage load. The storage location may be substantially similar to the storage locations discussed with respect to FIG. 1.

At 308, the data chunk identifier and the storage location are stored to cache memory. According to various embodiments, the data chunk identifier and the storage location may be stored in association with each other so that the data chunk identifier may be used as an index to identify the storage location for the data chunk.

At 310, a determination is made as to whether the amount of data stored in the cache memory has reached a cache memory capacity threshold. According to various embodiments, the cache memory capacity threshold may be strategically determined based on various considerations associated with the storage system. For instance, the cache memory capacity threshold may be a percentage or data size that reflects the total volume of cache memory available to the storage system.

At 312, one or more cached data chunks are identified to store to disk. According to various embodiments, the identified data chunks may include those that have been stored in the cache memory for a relatively long period of time. Typically data chunks that have been stored in the cache memory for a relatively long period of time are less likely to be requested in the near future than data chunks that were stored quite recently.

According to various embodiments, identifying one or more cached data chunks to store to disk may involve selecting data chunks that were grouped together temporally when they were originally stored to the cache memory. For instance, the identified cached data chunks may include a group of data chunks received as part of a request to perform a data storage task such as the data storage task A1 202 discussed with respect to FIG. 2.

At 314, each of the identified data chunk data dictionary entries is associated with a respective merge ID. According to various embodiments, the merge ID may include any data providing temporal locality information. For example, when a group of data chunks are merged to disk, each of the data chunks may be associated with the same merge ID. In this way, when one of the data chunk dictionary entries is subsequently retrieved from disk, one or more of the data chunk dictionary entries that have the same merge ID may also be retrieved.

According to various embodiments, various configurations of merge ID are possible. For example, when duplicate copies of a data chunk are stored, the data chunk may potentially be associated with more than one merge ID. In this case, different merge IDs may correspond with difference instances in which the storage system received a request to store the duplicate data chunk.

As another example, a merge ID may be divided into two or more components. The different components may identify different types of information such as hierarchical (e.g., parent-child) information linking different data chunks. For instance, in a series of related data storage tasks, a data chunk may have several versions that change across the data storage tasks. The different versions of the data storage task may share one merge ID component but differ in terms of another merge ID component. In this way, a requested data chunk may be opportunistically retrieved along with its parent data chunk, its sibling data chunks, or both.

As yet another example, different components of the merge ID may identify temporal locality information at different levels of granularity. For instance, one component of the merge ID may identify a large group of data chunks received at one time such as an identifier corresponding to the data storage task A1 202 discussed with respect to FIG. 2. Another component of the merge ID may identify a more granular group of data chunks such as a subset of the data storage task A1. In this way, a temporally local subset of a group of backed up data chunks may be opportunistically retrieved together.

At 316, each of the identified data chunk dictionary entries is stored to disk. According to various embodiments, the data chunk dictionary entries may be stored to a portion of the disk associated with the storage node on which the data dictionary resides. As discussed with respect to FIG. 1, the data dictionary may be divided into pages. Thus, storing the data chunk dictionary entries to disk may involve storing each data dictionary entry to the page in the disk-based dictionary associated with the data chunk.

At 318, the stored data chunk dictionary entries are marked as merged to allow cache overwriting. According to various embodiments, marking the entries as merged may involve, for instance, setting a flag for each of the entries. In this way, subsequent requests to store data dictionary information to the cache, either for new data chunk data or data chunk data retrieved from disk, may be stored in place of the entries that have been merged to disk.

Figure 4:
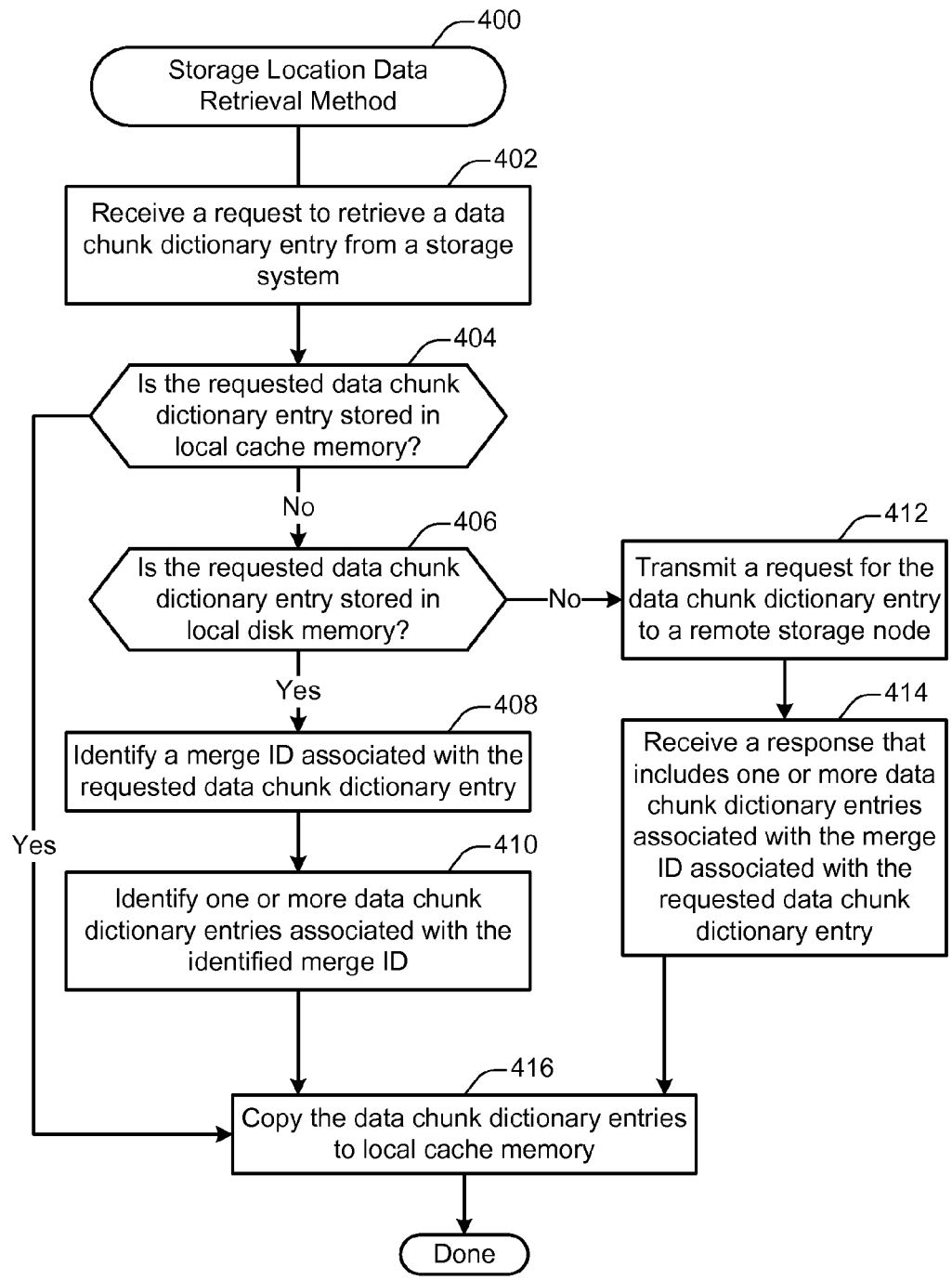
FIG. 4 illustrates a particular example of a method 400 for retrieval of storage location data.

FIG. 4 illustrates a particular example of a method 400 for retrieval of storage location data. According to various embodiments, the method 400 may be performed at a storage node in a deduplication storage system. A data chunk dictionary entry may be retrieved for any of various reasons. For example, the request may be received as part of a deduplication procedure configured to reduce the incidence of storing duplicate data on the storage system. As another example, the request may be received as part of a data retrieval procedure in which data stored on the storage system is being retrieved. For instance, the system may be in the process of restoring data from backup.

At 402, a request to retrieve a data chunk dictionary entry from a storage system is received. According to various embodiments, the request to retrieve a data chunk dictionary entry may include identifying information associated with the data chunk such as the data chunk identifier 104 discussed with respect to FIG. 1. As discussed with respect to FIG. 1, the data chunk identifier may be generated by applying a hash function to a data chunk. The data chunk identifier may uniquely or almost uniquely identify the data chunk.

At 404, a determination is made as to whether the requested data chunk dictionary entry is stored in local cache memory. According to various embodiments, the data chunk identifier may be used as an index to locate the requested data chunk data entry within the data dictionary. For instance, the data chunk identifier may identify a data dictionary page on which the data chunk dictionary entry would be present if it were in the local cache memory. Thus, the determination made at 404 may be performed by querying the local cache memory for the data chunk identifier.

At 406, a determination is made as to whether the requested data chunk dictionary entry is stored in local disk memory. According to various embodiments, the determination made at operation 406 may be substantially similar to the operation made at 408. The data chunk identifier associated with the requested data chunk dictionary entry may be used as an index to transmit a query to the local disk memory. The data chunk identifier may identify a location within the data dictionary, such as a page, at which the data chunk entry would be present if the data chunk is stored in the storage system.

At 408, a merge ID associated with the requested data chunk dictionary entry is identified. According to various embodiments, the merge ID may be stored to disk along with the other information included in the requested data chunk dictionary entry, as discussed with respect to FIGS. 1-3.

According to various embodiments, the merge ID may identify temporal locality information associated with the requested data chunk. For instance, the requested data chunk dictionary entry may share a merge ID with other data chunk dictionary entries stored at the same time as the requested data chunk dictionary entry.

At 410, one or more data chunk dictionary entries associated with the identified merge ID are identified. As discussed herein, a data chunk entry may be associated with one or more merge IDs, which may each encode temporal locality information. Accordingly, identifying one or more data chunk dictionary entries may involve any operations for locating entries that share identical or similar merge IDs as the requested data chunk.

In particular embodiments, a group of data chunk entries merged to disk at the same time may share a common merge ID. Accordingly, the identification of the data chunk dictionary entries at operation 410 may involve identifying any data chunk dictionary entries that share a common merge ID with the requested data chunk entry.

In particular embodiments, a merge ID may encode information such as hierarchical relationships between different data chunks, different versions of a data chunk over time, or any other temporal locality information. Accordingly, the identification of the data chunk dictionary entries at operation 410 may involve identifying parent data chunks, sibling data chunks, or both. Various types of temporal locality encodings and retrieval techniques may be employed.

At 412, a request for the data chunk dictionary entry is transmitted to a remote storage node via a network. The request may include the data chunk identifier discussed with respect to operation 402. The data chunk identifier may be used by the remote storage node to locate the requested data chunk dictionary entry at the remote storage node.

At 414, a response that includes one or more data chunk dictionary entries associated with the merge ID associated with the requested data chunk dictionary entry is received. According to various embodiments, the remote storage node may perform a procedure substantially similar to the operations 402-410 discussed with respect to FIG. 4.

For instance, the remote storage node may first check whether the requested data chunk entry is stored in its cache memory. If the requested data chunk entry is not stored in cache, then it may be retrieved from disk. Also, other data chunk dictionary entries that share the merge ID associated with the requested data chunk dictionary entry may be opportunistically retrieved as well.

When the data chunk dictionary entries are retrieved at the remote storage node, they may be transmitted back to the requesting node. In this way, the data chunk dictionary entries may be transmitted as a batch rather than in response to individual requests, thus reducing the number of messages that need to be transmitted and/or allowing for faster responses to future requests for the data chunk dictionary entries at the local storage node.

At 416, the data chunk dictionary entries are copied to local cache memory. According to various embodiments, the data chunk dictionary entries are copied to local cache memory so that in the event that subsequent requests for temporally local data chunks are received, responding to those requests may be resolved by accessing the cache memory rather than local disk storage or a remote storage node. Thus, disk access and/or network data transmission may be reduced.

In particular embodiments, copying the data chunk dictionary entries to the local cache memory may involve copying over data stored in the cache that has been flagged as merged to disk. In this way, the cache memory may be used efficiently without overwriting any data that has not already been stored to disk.

According to various embodiments, a requested data chunk dictionary entry may correspond to a data chunk that is not stored in the storage system. In this case, the requested data chunk dictionary entry would not be stored in the local cache memory, in the local disk memory, or at the remote storage node. Accordingly, the attempt to locate the data chunk at these locations would not succeed. Since no data chunk would be located, no merge ID would be found. Thus, in some instances, some operations shown in FIG. 4 such as operations 408, 410, 414, and 416 may be omitted if the data chunk is not stored in the storage system.

Figure 5:
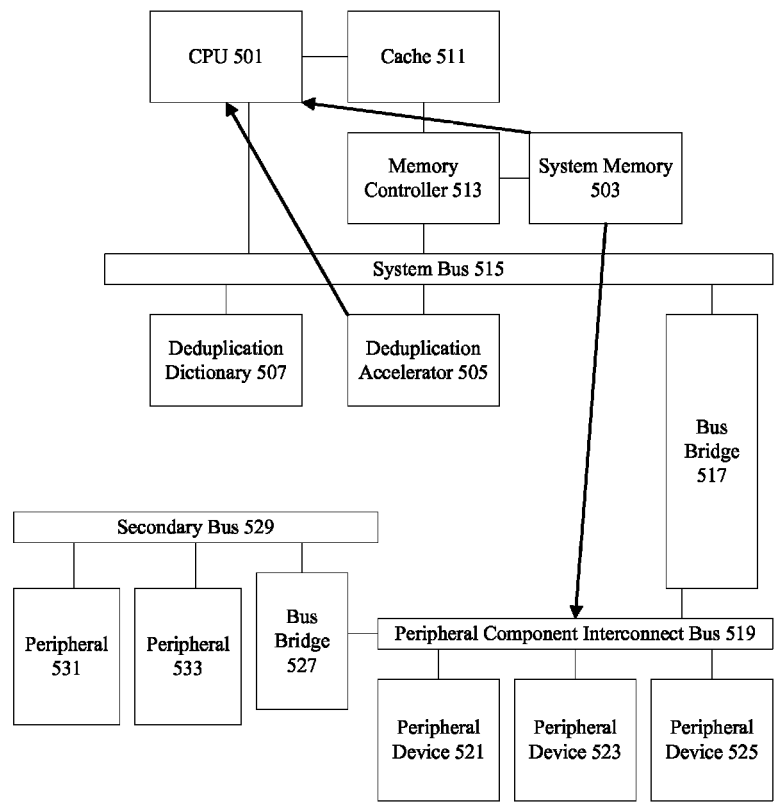
FIG. 5 illustrates a particular example of a system that can use the techniques and mechanisms of the present invention.

FIG. 5 illustrates a particular example of a system that can be uses in conjunction with the techniques and mechanisms of the present invention. According to various embodiments, data is received at an accelerated deduplication system 500 over an interface such as a network interface. A data stream may be received in segments or blocks and maintained in system memory 503. According to various embodiments, a processor or CPU 501 maintains a state machine but offloads boundary detection and fingerprinting to a deduplication engine or deduplication accelerator 505. The CPU 501 is associated with cache 511 and memory controller 513. According to various embodiments, cache 511 and memory controller 513 may be integrated onto the CPU 501.

In particular embodiments, the deduplication engine or deduplication accelerator 505 is connected to the CPU 501 over a system bus 515 and detects boundaries using an algorithm such as Rabin to delineate segments of data in system memory 503 and generates fingerprints using algorithms such as hashing algorithms like SHA-1 or MD-5. The deduplication engine 505 accesses the deduplication dictionary 507 to determine if a fingerprint is already included in the deduplication dictionary 507. According to various embodiments, the deduplication dictionary 507 is maintained in persistent storage and maps segment fingerprints to segment storage locations. In particular embodiments, segment storage locations are maintained in fixed size extents. Datastore suitcases, references, metadata, etc., may be created or modified based on the result of the dictionary lookup.

If the data needs to be transferred to persistent storage, the optimization software stack will communicate to the CPU 501 the final destination direct memory access (DMA) addresses for the data. The DMA addresses can then be used to transfer the data through one or more bus bridges 517 and/or 527 and secondary buses 519 and/or 529. In example of a secondary bus is a peripheral component interconnect (PCI) bus 519. Peripherals 521, 523, 525, 531, and 533 may be peripheral components and/or peripheral interfaces such as disk arrays, network interfaces, serial interfaces, timers, tape devices, etc.

Figure 6:
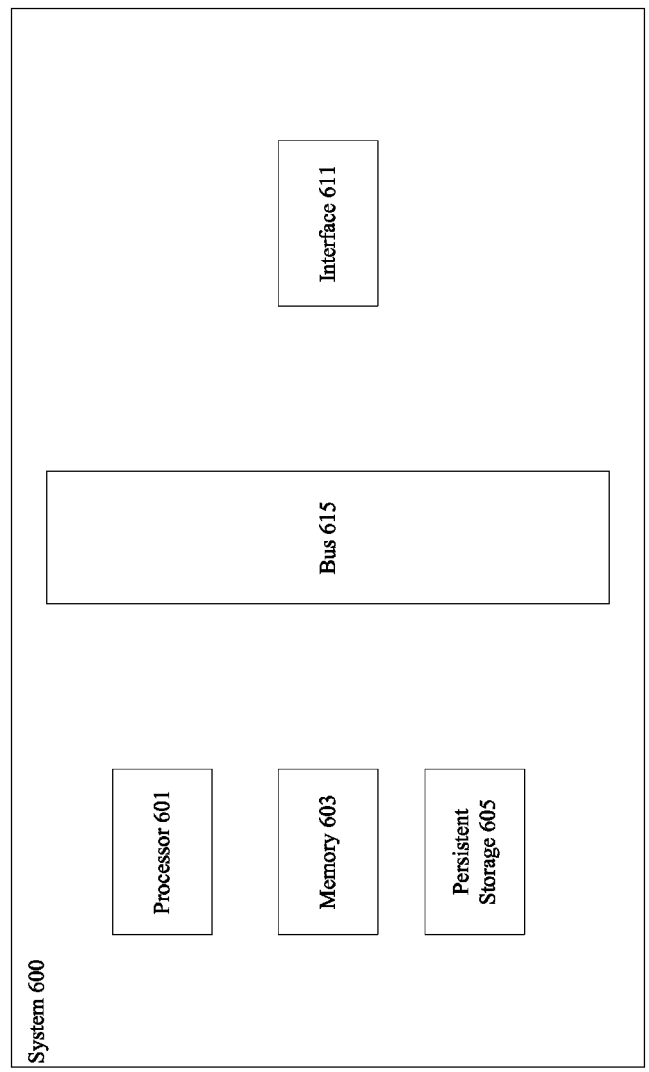
FIG. 6 illustrates a particular example of a storage system.

A variety of devices and applications can implement particular examples of the present invention. FIG. 6 illustrates one example of a system that can be used as a storage node in a deduplication system. According to particular example embodiments, a system 600 suitable for implementing particular embodiments of the present invention includes a processor 601, a memory 603, an interface 611, persistent storage 605, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 605 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
when it is determined that cache memory in a storage system has reached a capacity threshold, associating each of a plurality of data dictionary entries stored in the cache memory with a respective merge identifier, each data dictionary entry corresponding with a respective data chunk, each data dictionary entry indicating a storage location of the respective data chunk in the storage system, the respective merge identifier indicating temporal locality information about the respective data chunk; and
storing the plurality of data dictionary entries to disk memory in the storage system, each of the stored plurality of data dictionary entries including the respective merge identifier, the data dictionary entries stored to disk at the same time sharing the same merge identifier, the merge identifier indicating when the data dictionary entries were stored to disk.

2. The method recited in claim 1, wherein the respective data chunks corresponding with the plurality of data dictionary entries are associated with a common data storage task, the data storage task corresponding with a request to store a set of interrelated data to the storage system.

3. The method recited in claim 1, the method further comprising:
designating each of the plurality of data dictionary entries stored in the cache memory as stored to disk; and
overwriting at least a portion of the plurality of data dictionary entries stored in the cache memory with different data.

4. The method recited in claim 1, wherein each data dictionary entry includes a data chunk identifier, the data chunk identifier uniquely identifying the respective data chunk in the storage system, the data chunk identifier being determined by applying a hash function to the respective data chunk corresponding with the data dictionary entry.

5. The method recited in claim 1, wherein the storage system is configured to perform deduplication operations to reduce storage of duplicate data chunks on the storage system.

6. The method recited in claim 1, wherein the storage system includes a plurality of storage nodes in communication via a network.

7. A method comprising:
receiving a request to retrieve a designated data dictionary entry in a storage system, the designated data dictionary entry corresponding with a designated data chunk, the designated data dictionary entry indicating a storage location of the designated data chunk in the storage system, the designated data dictionary entry being associated with a designated merge identifier, the designated merge identifier indicating temporal locality information about the designated data chunk;
identifying a plurality of data dictionary entries that are each associated with the designated merge identifier, each of the plurality of data dictionary entries corresponding with a respective data chunk, the plurality of data dictionary entries including the designated data dictionary entry; and
storing the plurality of data dictionary entries to cache memory associated with the storage system, the data dictionary entries stored to disk at the same time sharing the same merge identifier, the merge identifier indicating when the data dictionary entries were stored to disk.

8. The method recited in claim 7, wherein the respective data chunks corresponding with the plurality of data dictionary entries are associated with a common data storage task, the data storage task corresponding with a request to store a set of interrelated data to the storage system.

9. The method recited in claim 7, wherein identifying the plurality of data dictionary entries comprises transmitting request via a network to a remote storage node.

10. The method recited in claim 7, wherein each of the plurality of data dictionary entries includes a respective data chunk identifier, the respective data chunk identifier uniquely identifying the respective data chunk in the storage system, the respective data chunk identifier being determined by applying a hash function to the respective data chunk corresponding with the data dictionary entry.

11. The method recited in claim 7, wherein the storage system is configured to perform deduplication operations to reduce storage of duplicate data chunks on the storage system.

12. The method recited in claim 7, wherein the storage system includes a plurality of storage nodes in communication via a network.

13. The one or more computer readable media having instructions stored thereon for performing a method, the method comprising:
when it is determined that cache memory in a storage system has reached a capacity threshold, associating each of a plurality of data dictionary entries stored in the cache memory with a respective merge identifier, each data dictionary entry corresponding with a respective data chunk, each data dictionary entry indicating a storage location of the respective data chunk in the storage system, the respective merge identifier indicating temporal locality information about the respective data chunk; and
storing the plurality of data dictionary entries to disk memory in the storage system, each of the stored plurality of data dictionary entries including the respective merge identifier, the data dictionary entries stored to disk at the same time sharing the same merge identifier, the merge identifier indicating when the data dictionary entries were stored to disk.

14. The one or more computer readable media recited in claim 13, wherein the respective data chunks corresponding with the plurality of data dictionary entries are associated with a common data storage task, the data storage task corresponding with a request to store a set of interrelated data to the storage system.

15. The one or more computer readable media recited in claim 13, the method further comprising:
designating each of the plurality of data dictionary entries stored in the cache memory as stored to disk; and
overwriting at least a portion of the plurality of data dictionary entries stored in the cache memory with different data.

* * * * *